(12) United States Patent
Harper et al.

(10) Patent No.: US 9,683,490 B2
(45) Date of Patent: Jun. 20, 2017

(54) PIVOTING FAN TRACK LINER FOR BLADE RETAINMENT

(71) Applicant: ROLLS-ROYCE PLC, London (GB)

(72) Inventors: Cedric Brett Harper, Derby (GB); Ian Colin Deuchar Care, Derby (GB); Julian Mark Reed, Derby (GB)

(73) Assignee: ROLLS-ROYCE plc, London (GB)

( * ) Notice: Subject to any disclaimer, the term of this patent is extended or adjusted under 35 U.S.C. 154(b) by 306 days.

(21) Appl. No.: 14/529,810

(22) Filed: Oct. 31, 2014

(65) Prior Publication Data

US 2015/0139779 A1    May 21, 2015

(30) Foreign Application Priority Data

Nov. 21, 2013  (GB) .................................. 1320577.8
Nov. 21, 2013  (GB) .................................. 1320578.6

(51) Int. Cl.
*F02C 7/05*    (2006.01)
*F01D 11/12*   (2006.01)
(Continued)

(52) U.S. Cl.
CPC .............. *F02C 7/05* (2013.01); *F01D 11/122* (2013.01); *F01D 21/04* (2013.01); *F01D 21/045* (2013.01);
(Continued)

(58) Field of Classification Search
CPC ...... F01D 21/045; F01D 11/127; F01D 21/04; F02C 7/05; F04D 29/52; F04D 25/24
(Continued)

(56) References Cited

U.S. PATENT DOCUMENTS 1,641,602 A  *  9/1927  Roberts .................. G11B 33/02
                                                    181/207
4,397,608 A  *  8/1983  Husain .................. F01D 21/045
                                                    415/121.2
(Continued)

FOREIGN PATENT DOCUMENTS

EP    2 290 199 A2    3/2011
EP    2 305 985 A2    4/2011
(Continued)

OTHER PUBLICATIONS

Mar. 23, 2015 Search Report issued in European Patent Application No. 14 19 1261.
(Continued)

*Primary Examiner* — Dwayne J White
*Assistant Examiner* — Topaz L Elliott
(74) *Attorney, Agent, or Firm* — Oliff PLC

(57) ABSTRACT

A fan containment system includes an annular casing element and a hook projecting in a generally radially inward direction from the annular casing element. A fan track liner is connected to the hook via a fastener. The fan track liner has a forward end proximal to the hook and a rearward end distal to the hook. A pivot member protrudes radially inward from the annular casing element and is arranged and positioned between the forward and rearward end of the fan track liner such that a forward portion of the fan track liner is pivotable about the pivot member, so that upon release of a fan blade the forward portion of the fan track liner pivots about the pivot member into a voidal region provided between the annular casing element and the forward portion of the fan track liner to encourage engagement of the hook with a released fan blade.

20 Claims, 7 Drawing Sheets

(51) Int. Cl.
*F01D 21/04* (2006.01)
*F02K 3/06* (2006.01)
*F01D 21/10* (2006.01)
*F01D 25/24* (2006.01)

(52) U.S. Cl.
CPC ........... *F01D 21/10* (2013.01); *F01D 25/246* (2013.01); *F02K 3/06* (2013.01); *F05D 2220/36* (2013.01)

(58) Field of Classification Search
USPC .......................................................... 415/9
See application file for complete search history.

(56) References Cited

U.S. PATENT DOCUMENTS

| | | | | |
|---|---|---|---|---|
| 5,431,532 | A | 7/1995 | Humke et al. | |
| 6,814,541 | B2* | 11/2004 | Evans | B29C 33/40 415/200 |
| 7,402,022 | B2* | 7/2008 | Harper | F01D 21/045 415/214.1 |
| 7,866,939 | B2* | 1/2011 | Harper | B64D 33/02 415/119 |
| 8,162,602 | B2* | 4/2012 | Caucheteux | F01D 11/122 415/115 |
| 8,231,328 | B2* | 7/2012 | Reed | F01D 21/045 415/174.4 |
| 8,888,439 | B2* | 11/2014 | Harper | F01D 21/045 415/174.4 |
| 8,894,349 | B2* | 11/2014 | Harper | F01D 21/045 415/214.1 |
| 2012/0224949 | A1* | 9/2012 | Harper | F01D 21/045 415/9 |
| 2014/0255152 | A1* | 9/2014 | Totten | F01D 25/24 415/9 |

FOREIGN PATENT DOCUMENTS

| | | |
|---|---|---|
| EP | 2 495 400 A2 | 9/2012 |
| EP | 2 600 008 A1 | 6/2013 |
| EP | 2 620 652 A1 | 7/2013 |
| EP | 2 620 654 A1 | 7/2013 |
| EP | 2 623 726 A2 | 8/2013 |

OTHER PUBLICATIONS

United Kingdom Search Report issued in GB1320577.8 issued Jun. 11, 2014.
United Kingdom Search Report issued in GB1320578.6 issued Jun. 11, 2014.

* cited by examiner

PIVOTING FAN TRACK LINER FOR BLADE RETAINMENT

FIELD OF INVENTION

The present invention relates to a fan containment system, a casing assembly, a fan and/or a gas turbine engine.

BACKGROUND

Turbofan gas turbine engines (which may be referred to simply as 'turbofans') are typically employed to power aircraft. Turbofans are particularly useful on commercial aircraft where fuel consumption is a primary concern. Typically a turbofan gas turbine engine will comprise an axial fan driven by an engine core. The engine core is generally made up of one or more turbines which drive respective compressors via coaxial shafts. The fan is usually driven directly off an additional lower pressure turbine in the engine core.

The fan comprises an array of radially extending fan blades mounted on a rotor and will usually provide, in current high bypass gas turbine engines, around seventy-five percent of the overall thrust generated by the gas turbine engine. The remaining portion of air from the fan is ingested by the engine core and is further compressed, combusted, accelerated and exhausted through a nozzle. The engine core exhaust mixes with the remaining portion of relatively high-volume, low-velocity air bypassing the engine core through a bypass duct.

To satisfy regulatory requirements, such engines are required to demonstrate that if part or all of a fan blade were to become detached from the remainder of the fan, that the detached parts are suitably captured within the engine containment system.

The fan is radially surrounded by a fan casing. It is known to provide the fan casing with a fan track liner and a containment system designed to contain any released blades or associated debris. Often, the fan track liner can form part of the fan containment system.

The fan track liner typically includes an annular layer of abradable material which surrounds the fan blades. During operation of the engine, the fan blades rotate freely within the fan track liner. At their maximum extension of movement and/or creep, or during an extreme event, the blades may cut a path into this abradable layer creating a seal against the fan casing and minimising air leakage around the blade tips.

An operational requirement of the fan track liner is that it is resistant to ice impact loads. A rearward portion of the fan track liner is conventionally provided with an annular ice impact panel. This is typically a glass-reinforced plastic (GRP) moulding which may also be wrapped with GRP to increase its impact strength. Ice which forms on the fan blades is acted on by both centrifugal and airflow forces, which respectively cause it to move outwards and rearwards before being shed from the blades. The geometry of a conventional fan blade is such that ice is shed from a trailing edge of the blade, strikes the ice impact panel, and is deflected without damaging the panel.

Swept fan blades are increasingly used in turbofan engines as they offer significant advantages in efficiency over conventional fan blades. Swept fan blades have a greater chord length at their central portion than conventional fan blades. This greater chord length means that ice that forms on a swept fan blade follows the same rearward and outward path as on a conventional fan blade but may reach a radially outer tip of the blade before it reaches the trailing edge. The ice will therefore be shed from the blade tip and may strike the fan track liner forward of the ice impact panel within the blade off zone (that is the region where a blade would contact the fan track liner in the event of a blade being detached from the fan).

A fan track liner used with a swept fan blade is therefore required to be strong enough to resist ice impact whilst allowing a detached fan blade to penetrate and be contained therewithin.

In recent years there has been a trend towards the use of lighter fan blades, which are typically either of hollow metal or of composite construction. These lighter fan blades have similar impact energy per unit area as an ice sheet, which makes it more difficult to devise a casing arrangement that will resist the passage of ice and yet not interfere with the trajectory of a released fan blade.

A conventional hard wall fan containment system or arrangement 100 is illustrated in FIG. 1 and surrounds a fan comprising an array of radially extending fan blades 40. Each fan blade 40 has a leading edge 44, a trailing edge 45 and fan blade tip 42. The fan containment arrangement 100 comprises a fan case 150. The fan case 150 has a generally frustoconical or cylindrical containment portion and a hook 160. The hook 160 is positioned axially forward of an array of radially extending fan blades 40. A fan track liner 152 is mechanically fixed or directly bonded to the fan case 150. The fan track liner 152 may be adhesively bonded to the fan case 150. The fan track liner 152 is provided as a structural filler to bridge a deliberate gap provided between the fan case 150 and the fan blade tip 42.

The fan track liner 152 has, in circumferential layers, an attrition liner 154 (also referred to as an abradable liner or an abradable layer), a filler layer which in this example is a honeycomb layer 158, and a septum 156. The septum layer 156 acts as a bonding, separation, and load spreading layer between the attrition liner 154 and the honeycomb layer 158. The honeycomb layer 158 may be an aluminium honeycomb. The tips 42 of the fan blades 40 are intended to pass as close as possible to the attrition liner 154 when rotating. The attrition liner 154 is therefore designed to be abraded away by the fan blade tips 42 during abnormal operational movements of the fan blade 40 and to just touch during the extreme of normal operation to ensure the gap between the rotating fan blade tips 42 and the fan track liner 152 is as small as possible without wearing a trench in the attrition liner 154. This allows the best possible seal between the fan blades 40 and the fan track liner 152 and so improves the effectiveness of the fan in driving air through the engine.

The purpose of the hook 160 is to ensure that, in the event that a fan blade 40 detaches from the rotor of the fan 12, the fan blade 40 will not be ejected through the front, or intake, of the gas turbine engine. During such a fan-blade-off event, the fan blade 40 travels tangentially to the curve of rotation defined by the attached fan blades. Impact with the containment system (including the fan track liner 152) of the fan case 150 prevents the fan blade 40 from travelling any further outside of the curve of rotation defined by the attached fan blades. The fan blade 40 will also move forwards in an axial direction, and the leading edge 44 of the fan blade 40 collides with the hook 160. Thus the fan blade 40 is held by the hook 160 and further axially forward movement is prevented. A trailing blade (not shown) then forces the held released blade rearwards where the released blade is contained.

As can be seen from FIG. 1, for the hook 160 to function effectively, a released fan blade 40 must penetrate a fan track attrition liner 154 in order for its forward trajectory to intercept with the hook. If the attrition liner 154 is too hard then the released fan blade 40 may not sufficiently crush the fan track liner 152.

However, the fan track liner 152 must also be stiff enough to withstand the rigours of normal operation without sustaining damage. This means the fan track liner 152 must be strong enough to withstand ice and other foreign object impacts without exhibiting damage for example. Thus there is a design conflict, where on one hand the fan track liner 152 must be hard enough to remain undamaged during normal operation, for example when subjected to ice impacts, and on the other hand allow the tip 42 of the fan blade 40 to penetrate the attrition liner 154. It is a problem of balance in making the fan track liner 152 sufficiently hard enough to sustain foreign object impact, whilst at the same time, not be so hard as to alter the preferred hook-interception trajectory of a fan blade 40 released from the rotor. Ice that impacts the fan casing rearwards of the blade position is resisted by an ice impact panel 153.

An alternative fan containment system is indicated generally at 100b in FIG. 2. The fan containment system 100b includes a fan track liner 152b that is connected to the fan casing 150b at both an axially forward position and an axially rearward position. At the axially forward position, the fan track liner is connected to the casing at hook 160b via a sprung fastener 166b. In the event of a fan blade detaching from the remainder of the fan, the fan blade impacts the fan track liner 152b and the fan track liner pivots about the rearward position of attachment to the casing (indicated at 167b in FIG. 2). Such an arrangement has been found to help balance the requirements for stiffness of the fan track liner with the requirements for resistance of operational impacts (e.g. ice impacts) ensuring a detached blade is held within the engine. However, any further improvements that can be made to help with this balance will be beneficial to engine design.

The fan track liner may be formed of a plurality of adjacent panels. During use, the panels need to resist pressure pulses from the rotating fan blades. Rubbing of the blades against the panels can cause panel wear and heating of the blade tips.

SUMMARY OF INVENTION

The present invention seeks to address one or more of the problems associated with fan containment systems of gas turbine engines of the prior art.

A first aspect of the invention provides a fan containment system for fitment around an array of radially extending fan blades mounted on a hub in an axial gas turbine engine. The fan containment system comprises an annular casing element for encircling an array of fan blades. A hook projects in a generally radially inward direction from the annular casing element and positioned axially forward of an array of fan blades when the fan containment system is fitted around said fan blades. A fan track liner is connected to the hook via a fastener configured so as to permit movement of the fan track liner relative to the hook. The fan track liner has a forward end proximal to the hook and a rearward end distal to the hook. A voidal region is provided between the annular casing element and a forward portion of the fan track liner. A pivot member protrudes radially inward from the annular casing element and is arranged and positioned between the forward and rearward end of the fan track liner such that a forward portion of the fan track liner is pivotable about the pivot member, so that upon release of a fan blade the forward portion of the fan track liner pivots about the pivot member into the voidal region provided between the annular casing element and the forward portion of the fan track liner to encourage engagement of the hook with a released fan blade (or part of a released fan blade).

The pivot member and the fastener permits the fan track liner to be spaced from the annular casing element.

Provision of the pivot member enables the position at which the fan track liner pivots relative to the annular casing element to be selected for optimal performance. For example, the position of the pivot member can be selected such that tip buckling of the blade is controlled for optimal timing of an impact of the blade with the hook so as to increase the probability of the blade being retained. It is known to have a fan track liner with a cantilevered trap door, but the pivot member permits the pivot point of a cantilevered trap door (the forward portion of the fan track liner of the first aspect) to be moved radially inwards and axially forwards compared to fan track liners of the prior art that have a cantilever configuration.

Furthermore, the pivot member permits in some embodiments the properties of the fan track liner to be varied axially along its length. One of the impacts on the fan track liner occurring during operation of an aero gas turbine engine is the impact of ice shed from the spinner and fan blades. During use of a conventional fan, ice is generally shed rearward. However, if a swept fan blade is used some ice is shed that impacts the fan track liner forward of the point aligned with the path of the leading edge of the tip of the fan blade. Where this invention is used, the properties of the track liner rearwards of the pivot point and even more so rearwards of the trailing edge of the blade tip can be selected so as to be more resistant to higher energy ice impacts.

In the present application forward and rearward and leading and trailing are defined with reference to axial air flow through a gas turbine engine to which the fan containment system is connected.

The pivot member may be located so that a controlled buckling of the released blade tip is made before the released blade's centre of gravity passes the pivot member. This controlled buckling of the blade takes energy out of the released blade. As the released blade moves forwards and outwards it causes the forward portion (or cantilevered trap door) of the fan track liner to rotate about the pivot member in a direction towards the annular casing member such that the released blade is controlled and guided to time its arrival at the hook in relation to a trailing blade (i.e. so that the trailing blade forces the held released blade rearwards for containment by bypass guide vanes of a gas turbine engine).

The pivot member may be positioned to be, in use, between a position substantially axially aligned with a leading edge of a fan blade and a position substantially axially rearwards of a trailing edge of a fan blade or a position substantially axially aligned with a trailing edge of a fan blade. For example, the pivot member may be positioned so as to be substantially axially aligned with a position that is substantially aligned with an axial central region of a fan blade tip (e.g. a region that is one quarter of the tip axial length from the leading edge and from the trailing edge of the fan blade tip). The pivot member may be substantially aligned with a mid-region of the fan track liner.

One or more circumferential ribs may be located around a radially outer surface of the annular casing member. In an exemplary embodiment a circumferential rib may be positioned, in use, substantially axially aligned with a leading edge of a fan blade and/or a circumferential rib may be positioned to be substantially axially aligned, in use, with a position between a leading edge of a fan blade and a trailing edge of a fan blade.

The pivot member may be positioned to be substantially aligned with a circumferential rib, for example, the pivot member may have a radial component (i.e. a component that extends more in the radial than in the axial direction) and the radial component may be substantially aligned with a circumferential rib. In such embodiments, the pivot member (in particular a radial component of the pivot member) can be made smaller (e.g. thinner) because of the increased stiffness at the circumferential rib.

The fan track liner may comprise an attrition layer positioned, in use, proximal to the fan blades. The fan track liner may comprise a filler layer connected to the attrition layer on a side of the attrition layer distal to, in use, the fan blades. The filler layer may be non-isotropic. The filler layer may be deformable above a pre-determined load (e.g. the force applied to the filler layer when a fan blade is released from the remainder of a fan).

The filler layer may comprise two or more differing sections of differing configurations and/or materials (e.g. the filler layer may comprise a forward portion and a rearward portion, the rearward portion having different properties to the forward portion), such that the filler layer has differing properties in an axial direction. Such an arrangement permits the fan track liner to have variable properties along its axial length such that the demands for high energy ice impact can be catered for in a more rearward portion. The requirements for a fan blade off scenario can be catered for in a forward region of the fan track liner and in a region radially outward of the fan blades (i.e. in the fan blade off zone).

The filler layer may be a honeycomb structure e.g. an aluminium honeycomb structure.

The fan track liner may further comprise a tray to which the filler layer is bonded.

The fan track liner may further comprise a septum layer between the attrition layer and the filler layer. Additionally or alternatively, the fan track liner may comprise a septum layer positioned between a first and a second sub-layer of the filler layer. The first sub-layer may have a different density to the second sub-layer.

The attrition layer may comprise two or more differing sections of differing configurations and/or materials (e.g. the attrition layer may comprise a forward portion and a rearward portion, the forward portion having different properties to the rearward portion). Varying the properties of the attrition layer along the axial length of the fan track liner further improves the performance of the fan track liner in respect of impact resistance (e.g. ice impact) and also in a fan blade off scenario.

The pivot member may be a standoff.

The pivot member may fully circumferentially surround a fan (e.g. the pivot member may be made as a single full ring or as a series of arcuate members positioned adjacent each other to form a full ring), alternatively the pivot member may be made of a series of arcuate members that are circumferentially spaced from each other, e.g. a series of individual projections protruding radially from the annular casing element.

The pivot member may have a substantially L-shaped cross section. Alternatively, the pivot member may be square or rectangular cross-section.

When the pivot member is substantially L-shaped, the pivot member may be angled towards a forward position of the fan containment system (i.e. the L-shaped pivot member may have a radial component and an axial component, the axial component extending forwards of the radial component). In such an arrangement, the forward portion of the fan track liner pivots (at least initially) about a free end of the axial component of the L-shaped member (i.e. the end of the axial component that is spaced from the radial component).

The pivot member may be configured to bend in a forward direction when the fan track liner is impacted by a fan blade.

The fan track liner may comprise a plurality of panels, e.g. a plurality of arcuate panels (e.g. in use having an axis substantially co-axial with a fan of a gas turbine engine). The panels may be positioned adjacent to each other to form a cylindrical or frusto-conical fan track liner. The panels may be selectively securable to the pivot member. For example, one or more of the plurality of panels may be secured to the pivot member, e.g. via a fastener, clip, mechanical interface, or bonding. Selectively securing the panels to the pivot member beneficially increases stability and creates nodes for reducing vibration, which in turn reduces wear of the fan track attrition liner and fatigue in the fan containment system. In such embodiments, the panels are secured to the pivot member rather than to the annular casing element, so fire integrity and containment integrity are maintained. When one or more of the plurality of panels are secured to the pivot member via a fastener, a head of the fastener may be sunk within the fan track liner and covered (e.g. with attrition layer material), e.g. the fastener could be considered embedded in the fan track liner. Such an arrangement removes substantial gaps or holes from the fan track liner which could result in damage of the fan track liner during use.

When the fan track liner comprises a plurality of adjacent fan track liner panels, each fan track liner panel may be connected to the standoff via one or more fasteners, and the fasteners may be spaced so as to break up the natural resonance of the fan track liner panels. This mitigates the risk of a passing blade forcing a natural vibration of a fan track liner panel in an operational running range of the fan. Further, such spacing of the fasteners means that adjacent fan track liner panels can damp vibration of their neighbors. Additionally or alternatively, the one or more fasteners may be spaced to be circumferentially out of phase with the fasteners that connect to the hook, and/or the fasteners that may connect a rearward end of the fan track liner panel to the annular casing element.

The voidal region may extend substantially along the length of the fan track liner. In such embodiments, the voidal region may have a thickness substantially equal along the axial length of the fan track liner. Alternatively, the voidal region may have a varying thickness along the axial length of the fan track liner. E.g. a portion of the fan track liner that is axially rearward of the pivot member may be thicker than a portion of the fan track liner that is axially forward of the pivot member.

A support member may protrude radially inward from the annular casing. The support member may be positioned axially rearward of the pivot member. The support member may support the rearward end of the fan track liner. Advantageously, the use of a pivot member and when the fan track liner is secured to the pivot member, the fan track liner can extend rearwardly to the support member, e.g. the support member is covered by the attrition layer. Furthermore, it means that the support member can be arranged so that any step that may be created (although minimal) will be in the direction of airflow (i.e. the step is radially towards the annular casing element in a rearward direction) which reduces the aerodynamic impact of the support member. The support member may be formed of a plurality of individual protrusions from the annular casing element spaced circumferentially around the annular casing element, or the support member may extend around the full circumference of the annular casing element.

The rearward end of the fan track liner may be connected to the support member (e.g. using one or more fasteners or bonding). In such an embodiment the fan track liner may connect to the support member via an attrition layer, a tray and/or a connecting plate.

A second aspect of the invention provides a fan containment system for fitment around an array of radially extending fan blades mounted on a hub in an axial gas turbine engine, the fan containment system comprising:
  an annular casing element for encircling an array of fan blades;
  a hook projecting in a generally radially inward direction from the annular casing element and positioned axially forward of an array of fan blades when the fan containment system is fitted around said fan blades;
  a fan track liner connected to the hook via a fastener configured so as to permit movement of the fan track liner relative to the hook, the fan track liner having a forward end proximal to the hook and a rearward end distal to the hook;
  a standoff protruding radially inward from the annular casing element; and
  one or more connectors securing the fan track liner to the standoff.

Securing the panels to the standoff beneficially increases stability and creates nodes for reducing vibration, which in turn reduces wear of the fan track attrition liner and fatigue in the fan containment system. In such embodiments, the panels are secured to the standoff rather than to the annular casing element, so fire integrity and containment integrity are maintained.

The connector may be for example a bolt, a fastener, a clip, a mechanical interface, or an adhesive or other suitable bonding mechanism.

The fan track liner may be formed of an axially forward part and an axially rearward part. The axially forward and/or the axially rearward part may be secured to the annular casing element via one or more standoffs and one or more connectors.

The fan track liner may comprise a plurality of adjacent fan track liner panels and each fan track liner panel may be connected to the standoff via one or more fasteners. The fasteners may be spaced so as to break up the natural resonance of the fan track liner panels. This mitigates the risk a passing blade forcing a natural vibration of a fan track liner panel in an operational running range of the fan. Further, such spacing of the fasteners means that adjacent fan track liner panels can damp vibration of their neighbours.

The fan track liner may comprise a plurality of adjacent fan track liner panels and each fan track liner panel may be connected to the standoff via one or more fasteners. The one or more fasteners may be spaced to be circumferentially out of phase with the fasteners that may connect to the hook, and/or fasteners that may connect a rearward end of the fan track liner panel to the annular casing element (e.g. via a rearward support).

As will be appreciated by the person skilled in the art the fan containment system of the second aspect may have one, or any combination, of features of the first aspect.

A third aspect of the invention provides a fan containment system for fitment around an array of radially extending fan blades mounted on a hub in an axial gas turbine engine, the fan containment system comprising:
  a fan case having an annular casing element for encircling an array of fan blades and a hook projecting in a generally radially inward direction from the annular casing element and positioned axially forward of an array of fan blades when the fan containment system is fitted around said fan blades; and
  a fan track liner wherein the fan track liner is connected to the fan case at the hook via a first connector and at a position axially rearward of the hook via a second connector, wherein the first connector is configured so as to deform or fail to permit movement of the fan track liner relative to the hook such that a forward region of the fan track liner can pivot towards the annular casing element when a pre-determined load is applied to the forward region of the fan track liner.

The forward region of the fan track liner may be shaped so as to have in an axially rearward direction a gradually increasing radial thickness and then a decreasing radial thickness so as to form an apex adjacent the annular casing element.

Advantageously, the gradually increasing radial thickness of the fan track liner increases the stiffness of the fan track liner in a rearward direction. Such an increase in thickness means that the first fastener will fail in preference to the second fastener so that the forward region (also referred to as the trap door) of the fan track liner can pivot towards the annular casing element so as to direct a released blade or a released part of a blade towards the hook for containment.

In the event of a failure occurring at a connector or region other than the first connector, the apex adjacent the annular casing element will quickly ground against the annular casing element to create a load hard point. The presence of a load hard point will generally concentrate an applied load forward to encourage failure or deformation of the first connector.

The region of gradually increasing radial thickness may be directly adjacent the region of decreasing radial thickness. The apex may be a substantially pointed peak or a rounded peak. The region of decreasing radial thickness may be a step decrease or may be a gradual decrease.

The second connector may connect the fan track liner to the fan case at a position adjacent the forward region of the fan track liner. Such an arrangement means that the fan track liner is thickened in the region of the second connector so that the fan track liner has increased stiffness towards the second fastener. This means that as well as the less stiff forward section concentrating a forward load so that the forward connector preferentially fails, the region of the second connector is reinforced to further resist failure.

If a blade or part of a blade impacts the forward region (or trap door) of the fan track liner, the trap door may pivot substantially about the second connector.

The annular casing may comprise a standoff and the second connector may connect the fan track liner to the standoff.

The radial thickness of the fan track liner may be substantially constant in a region of the second connector.

A gap may be provided between the apex and the annular casing element. Provision of such a gap eases manufacture because the fan track liner can be made to a larger tolerance.

The forward region of the fan track liner may be generally wedge shaped.

In the region of the fan track liner having increasing radial thickness, the radial thickness of the fan track liner may increase linearly. Such an arrangement means that a released blade will see a more uniform stiffness as it contacts the fan track liner, which means that a released blade will have a similar effect on the fan track liner independent of where the blade is released.

The radial thickness may increase at a first rate of change and then increase at a second rate of change. For example, the radial thickness may increase in the forward region of the fan track liner. In such an embodiment, the rate of change may change at a position mid-way along the length of the fan track liner. Alternatively or additionally, the fan track liner may have two or more portions having different filler layers and/or attrition layers, and the change in the rate of change of increase may be at a position substantially coincident with a change in filler and/or attrition layer.

In the region of the fan track liner having decreasing radial thickness, the radial thickness of the fan track liner may decrease linearly. For example, the forward region of the fan track liner may have a portion that has a substantially triangular cross section. Alternatively, the radial thickness may increase and/or decrease following a curved profile.

A gas washed surface of the fan track liner may substantially follow the profile of the annular casing element.

The fan track liner may comprise a filler layer and the filler layer may be arranged to extend into the forward region of the fan track liner of increasing radial thickness. The filler layer may be configured so as to be deformable, such that in a blade off scenario the filler layer deforms to absorb energy so as to control movement of a released blade towards the hook and to further encourage the blade towards the hook.

The filler layer may be non-isotropic. The filler layer may be deformable above a pre-determined load (e.g. the force applied to the filler layer when a fan blade is released from the remainder of a fan).

The filler layer may be a honeycomb structure e.g. an aluminium honeycomb structure.

The fan track liner may further comprise a septum layer between the attrition layer and the filler layer. Additionally or alternatively, the fan track liner may comprise a septum layer positioned between a first and a second sub-layer of the filler layer. The first sub-layer may have a different density to the second sub-layer.

The fan track liner may comprise a tray that defines a radially outward profile of the fan track liner.

The fan track liner may comprise an abradable liner positioned, in use, proximal to the fan blades.

The fan containment system may comprise a voidal region provided between the annular casing element and the forward region of the fan track liner. Provision of a voidal region reduces the weight of the fan containment system.

After a fan blade or part of a fan blade has been released from the fan, the fan system will be out of balance and will therefore describe a larger orbit. Provision of a fan track liner with radially increasing thickness means that liner material is present in the voidal region, and therefore in the extended orbit which reduces the risk of the orbiting fan from cutting through the liner tray or touching the case.

The fan containment system may comprise a pivot member protruding radially inward from the annular casing element and being arranged and positioned between a forward and rearward end of the fan track liner such that the forward region of the fan track liner is pivotable about the pivot member, so that upon release of a fan blade the forward region of the fan track liner pivots about the pivot member into a voidal region that may be provided between the annular casing element and the forward region of the fan track liner to encourage engagement of the hook with a or part of a released fan blade.

Provision of the pivot member enables the position at which the fan track liner pivots relative to the annular casing element to be selected for optimal performance. For example, the position of the pivot member can be selected such that tip buckling of the blade is controlled for optimal timing of an impact of the blade with the hook so as to increase the probability of the blade being retained. It is known to have a fan track liner with a cantilevered trap door, but the pivot member permits the pivot point of a cantilevered trap door (the forward portion of the fan track liner) to be moved radially inwards and axially forwards compared to fan track liners of the prior art that have a cantilever configuration.

Furthermore, the pivot member permits in some embodiments the properties of the fan track liner to be varied axially along its length. One of the impacts on the fan track liner occurring during operation of an aero gas turbine engine is the impact of ice shed from the spinner and fan blades. During use of a conventional fan, ice is generally shed rearward. However, if a swept fan blade is used some ice is shed that impacts the fan track liner forward of the point aligned with the path of the leading edge of the tip of the fan blade. Where this invention is used, the properties of the track liner rearwards of the pivot point and even more so rearwards of the trailing edge of the blade tip can be selected so as to be more resistant to higher energy ice impacts.

The second connector may connect the fan track liner to the pivot member. The second connector may comprise a plurality of fasteners spaced along the fan track liner. A fan track liner with radially increasing thickness has been found to be particularly advantageous in such an arrangement because the fixing of the liner to the casing is discontinuous which means that as a released fan blade passes tangentially across the liner, the loading changes which creates successive loading of fasteners and pivot members and various load concentrations. This means that the risk of the second fastener or the fan track liner failing in preference to the first fastener is increased. The increasing radial thickness of the fan track liner reduces this risk.

The pivot member may have a substantially L-shaped cross section. Alternatively, the pivot member may be square or rectangular cross-section.

A support member may protrude radially inward from the annular casing. The support member may be positioned axially rearward of the pivot member. The support member may support the rearward end of the fan track liner. Advantageously, the use of a pivot member and when the fan track liner is secured to the pivot member, the fan track liner can extend rearwardly to the support member, e.g. the support member is covered by the attrition layer. Furthermore, it means that the support member can be arranged so that any step that may be created (although minimal) will be in the direction of airflow (i.e. the step is radially towards the annular casing element in a rearward direction) which reduces the aerodynamic impact of the support member. The support member may be formed of a plurality of individual protrusions from the annular casing element spaced circumferentially around the annular casing element, or the support member may extend around the full circumference of the annular casing element.

The rearward end of the fan track liner may be connected to the support member (e.g. using one or more fasteners or bonding). In such an embodiment the fan track liner may connect to the support member via an attrition layer, a tray and/or a connecting plate.

The fan track liner may comprise a plurality of panels, e.g. a plurality of arcuate panels (e.g. in use having an axis substantially co-axial with a fan of a gas turbine engine).

The panels may be positioned adjacent to each other to form a cylindrical or frusto-conical fan track liner.

The first connector and/or the second connector may be formed of a plurality of fasteners spaced around the fan track liner.

The first connector may comprise a plurality of fracturable fasteners, sprung fasteners and/or fasteners with a compressible insert.

A fourth aspect the present invention provides a fan containment system for fitment around an array of radially extending fan blades mounted on a hub in an axial gas turbine engine, the fan containment system comprising:
- a fan case having an annular casing element for encircling an array of fan blades and a hook projecting in a generally radially inward direction from the annular casing element and positioned axially forward of an array of fan blades when the fan containment system is fitted around said fan blades; and
- a fan track liner wherein the fan track liner is connected to the fan case at the hook via a first connector and at a position axially rearward of the hook via a second connector, wherein the first connector is configured so as to deform or fail to permit movement of the fan track liner relative to the hook such that a forward region of the fan track liner can pivot towards the annular casing element when a pre-determined load is applied to the forward region of the fan track liner;
- a voidal region provided between the annular casing element and the forward region of the fan track liner; and
- a pivot member protruding radially inward from the annular casing element and being arranged and positioned between a forward and rearward end of the fan track liner such that the forward region of the fan track liner is pivotable about the pivot member, so that upon release of a fan blade the forward region of the fan track liner pivots about the pivot member into the voidal region provided between the annular casing element and the forward region of the fan track liner to encourage engagement of the hook with a or part of a released fan blade; and
- wherein a region forward of the pivot member is shaped so as to have in an axially forward direction a gradually decreasing radial thickness.

The fan containment system of the fourth aspect may have any one of, or any combination of, optional features of the third aspect.

A fifth aspect of the invention provides a fan containment system for fitment around an array of radially extending fan blades mounted on a hub in an axial gas turbine engine, the fan containment system comprising:
- a fan case having an annular casing element for encircling an array of fan blades and a hook projecting in a generally radially inward direction from the annular casing element and positioned axially forward of an array of fan blades when the fan containment system is fitted around said fan blades; and
- a fan track liner wherein the fan track liner is connected to the fan case at the hook via a first connector and at a position axially rearward of the hook via a second connector, wherein the first connector is configured so as to deform or fail to permit movement of the fan track liner relative to the hook such that a forward region of the fan track liner can pivot towards the annular casing element when a pre-determined load is applied to the forward region of the fan track liner; and
- wherein the fan track liner is configured such that when the fan track liner is impacted by a released fan blade a portion of a radially outer surface of the fan track liner moves into contact with the annular casing element and the fan track liner pivots about a point of contact between the radially outer surface of the fan track liner and the annular casing element.

Advantageously, providing the pivot point on the fan track liner means that the point at which the forward region (or trap door) pivots can be optimised for the fan about which the fan containment system is to be positioned.

The radially outer surface of the fan track liner may be profiled so as to define a region proximal to the annular casing element about which the fan track liner can pivot. The region proximal to the annular casing element may be spaced from the annular casing element during standard operation of the fan track liner (i.e. in a non-fan blade off scenario). Such an arrangement eases manufacture because the fan track liner can be manufactured to larger tolerances.

The fan track liner panel may be shaped so as to decrease in thickness towards the hook from a position adjacent the region of the fan track liner that contacts the annular casing element when a released fan blade impacts the fan track liner panel. Such an arrangement means that when the fan track liner contacts the annular casing element the loads are concentrated in a forwards direction which further increases the likelihood of failure of the first connector and pivoting of the forward portion towards the annular casing element (i.e. the trap door being activated).

A sixth aspect of the invention provides a fan casing comprising the fan containment system of the first, second, third, fourth or fifth aspects.

A seventh aspect of the invention provides a fan comprising the fan containment system according to the first, second, third, fourth or fifth aspects and/or the fan casing according to the sixth aspect.

An eighth aspect of the invention provides a gas turbine engine comprising the fan containment system according to the first, second, third, fourth or fifth aspect, the fan casing according to the sixth aspect, and/or the fan according to the seventh aspect.

DESCRIPTION OF DRAWINGS

In the accompanying drawings, similar reference numerals are used in FIG. 2 as in FIG. 1 but with a suffix "b" to distinguish between arrangements; similar reference numerals are used in FIGS. 6 and 7 as in FIG. 4, but with a prefix "4" or "5," respectively, instead of "2" so as to distinguish between embodiments; and similar reference numerals are used in FIG. 5 as in FIG. 4, but with a prefix "3" instead of "2" so as to distinguish between embodiments.

The invention will now be described, by way of example only, with reference to the accompanying drawings in which.

DETAILED DESCRIPTION

Figure 1:
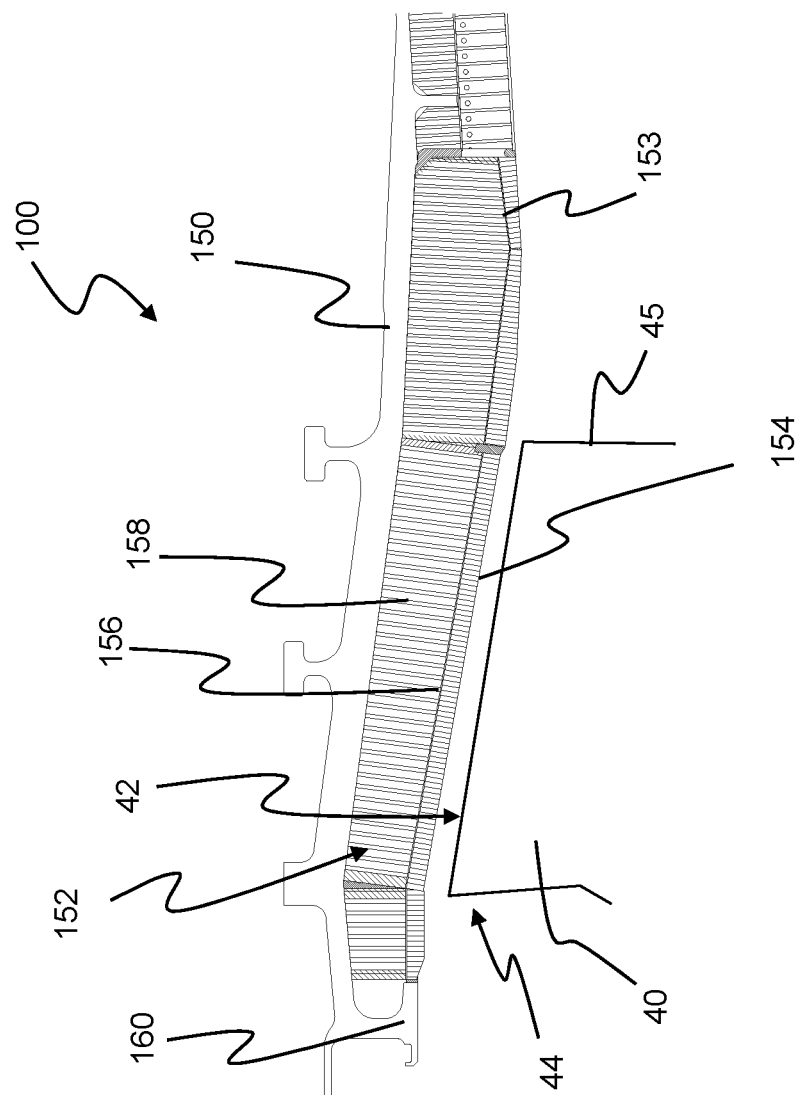
FIG. 1 is a partial view of a cross-section through a typical fan case arrangement of a gas turbine engine of the prior art.
Figure 2:
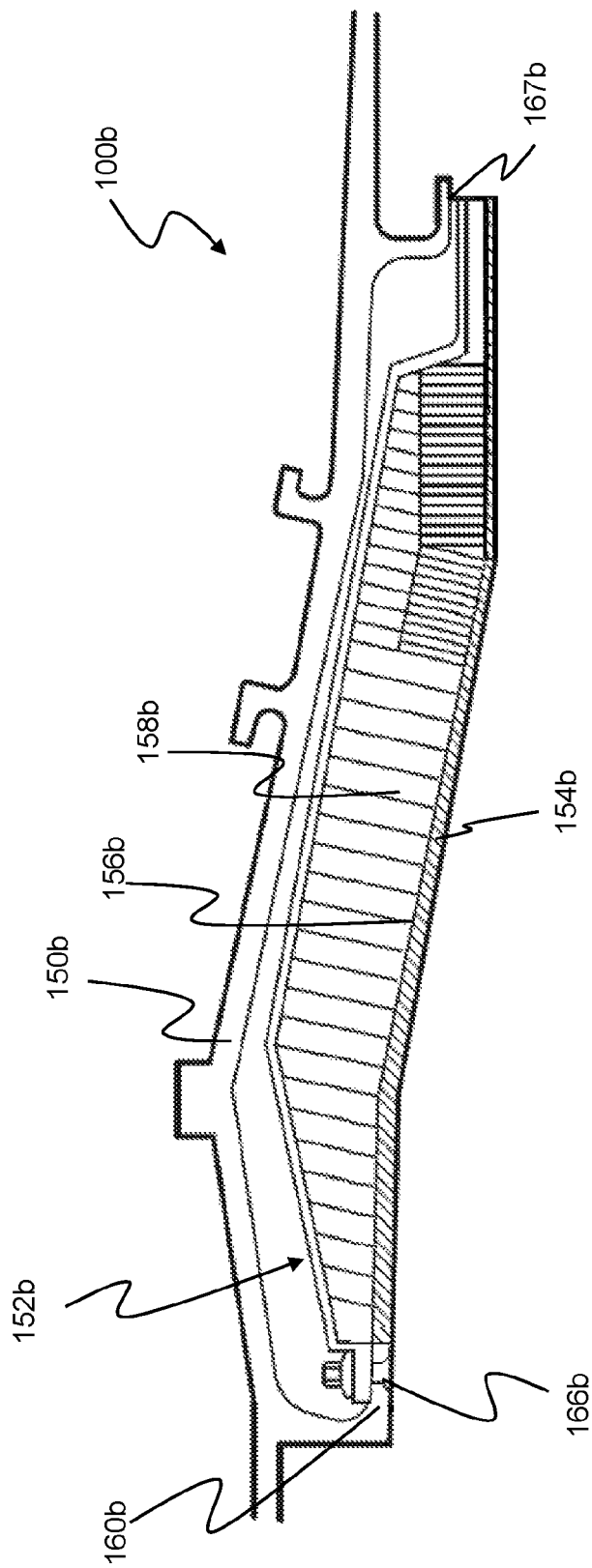
FIG. 2 is a partial view of a cross-section through an alternative fan case arrangement of a gas turbine engine of the prior art.
Figure 3:
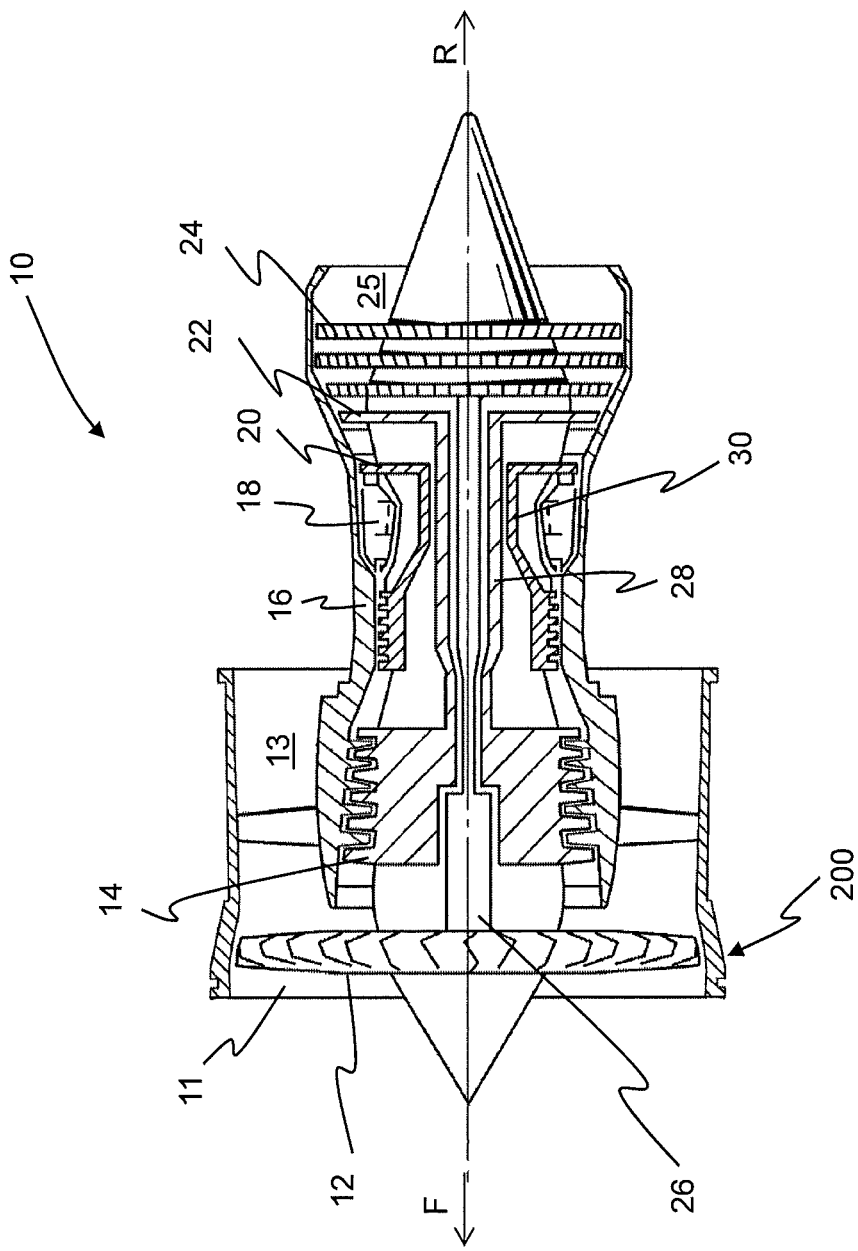
FIG. 3 is a cross-section through the rotational axis of a high-bypass gas turbine engine.

With reference to FIG. 3 a bypass gas turbine engine is indicated at 10. The engine 10 comprises, in axial flow series, an air intake duct 11, fan 12, a bypass duct 13, an intermediate pressure compressor 14, a high pressure compressor 16, a combustor 18, a high pressure turbine 20, an intermediate pressure turbine 22, a low pressure turbine 24 and an exhaust nozzle 25. The fan 12, compressors 14, 16 and turbines 20, 22, 24 all rotate about the major axis of the gas turbine engine 10 and so define the axial direction of the gas turbine engine.

Air is drawn through the air intake duct 11 by the fan 12 where it is accelerated. A significant portion of the airflow is discharged through the bypass duct 13 generating a corresponding portion of the engine thrust. The remainder is drawn through the intermediate pressure compressor 14 into what is termed the core of the engine 10 where the air is compressed. A further stage of compression takes place in the high pressure compressor 16 before the air is mixed with fuel and burned in the combustor 18. The resulting hot working fluid is discharged through the high pressure turbine 20, the intermediate pressure turbine 22 and the low pressure turbine 24 in series where work is extracted from the working fluid. The work extracted drives the intake fan 12, the intermediate pressure compressor 14 and the high pressure compressor 16 via shafts 26, 28, 30. The working fluid, which has reduced in pressure and temperature, is then expelled through the exhaust nozzle 25 generating the remainder of the engine 10 thrust.

The intake fan 12 comprises an array of radially extending fan blades 40 that are mounted to the shaft 26. The shaft 26 may be considered a hub at the position where the fan blades 40 are mounted. FIG. 3 shows that the fan 12 is surrounded by a fan containment system 200 that also forms one wall or a part of the bypass duct 13.

In the present application a forward direction (indicated by arrow F in FIG. 3) and a rearward direction (indicated by arrow R in FIG. 3) are defined in terms of axial airflow through the engine 10.

Figure 4:
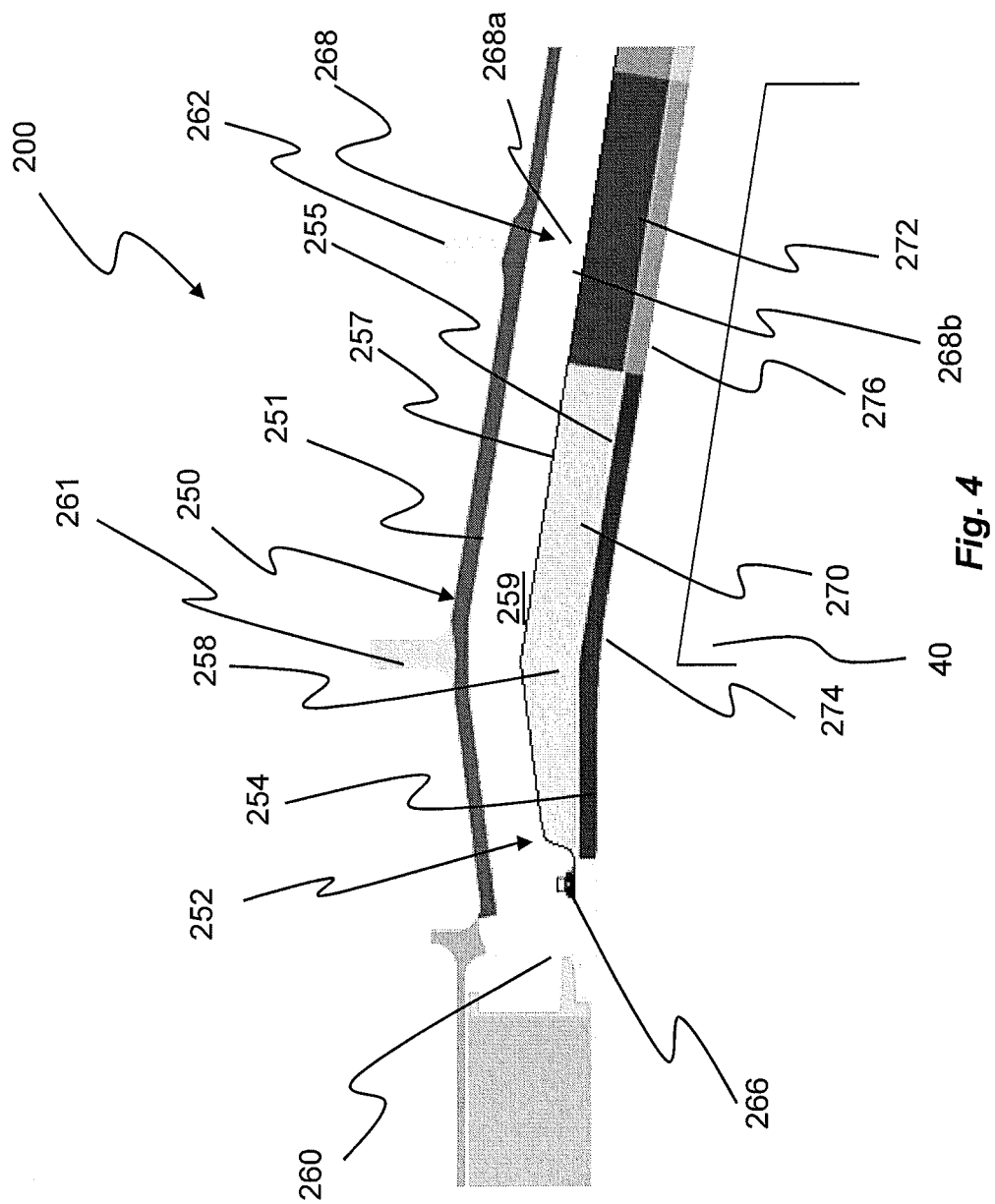
FIG. 4 is a partial cross-section through a fan blade containment system.

Referring now to FIG. 4, the fan containment system 200 is shown in more detail. The fan containment system 200 comprises a fan case 250. The fan case 250 includes an annular casing element 251 that, in use, encircles the fan blades 40 of the gas turbine engine 10. The fan case 250 further includes a hook 260 that projects from the annular casing element in a generally radially inward direction. The hook 260 is positioned, in use, axially forward of the fan blades 40 and the hook is arranged so as to extend axially inwardly, such that in a fan blade off scenario the hook 260 prevents the fan blade from exiting the engine 10 through the air intake duct 11.

Circumferential ribs 261, 262 are positioned around the annular casing element 251 for stiffening the fan case 250. One of said circumferential ribs 261 is positioned so as to be substantially aligned with a leading edge of the fan blade 40. Another circumferential rib 262 is positioned axially rearward of the other circumferential rib 261, in an axial position substantially coincident with a position between the leading and trailing edge of the fan blade 40.

A fan track liner 252 is connected to the fan case 250 at the hook 260 via a fastener 266. The fastener 266 biases the fan track liner to a position substantially aligned with the lower end of the hook 260 and permits movement of the fan track liner relative to the hook when a pre-determined force is applied to the fan track liner. In the present embodiment, the fastener 266 is a sprung fastener such that movement of the fan track liner radially outwards towards the fan case is permitted when a load exerted on the fan track liner exceeds a predetermined level (in alternative embodiments an alternative fastening mechanism may be used e.g. a crushable collar or fastener designed to shear/fracture at a predetermined load). In the present embodiment, the fan track liner is formed of a plurality of arcuate fan track liner panels positioned adjacent to each other such that an axis of each arcuate fan track liner is substantially co-axial so to form a substantially cylindrical (or in alternative embodiments a substantially frusto-conical) fan track liner.

Generally, the fan track liner 252 includes a tray 257 to which a filler layer 258 is connected (e.g. bonded). An attrition layer 254 is positioned, in use, proximal to the fan blades 40. In the present embodiments, a septum layer 255 is the interface between the attrition layer and the filler layer, forming part of the bond between the two. The septum layer 255 also separates the attrition layer and the filler layer and distributes any applied load between the attrition layer and the filler layer. The tray 257 is connected to the hook 260 via the fastener 266 so as to connect the fan track liner 252 to the fan case 250. The structure of the fan track liner 252 is described in more detail below.

The fan track liner 252 is spaced radially inward from the casing element 251 so that a voidal region 259 is formed between the fan track liner 252 and the casing element 251.

A standoff (or pivot member) 268 extends radially inwardly from the annular casing member 251 into the voidal region 259. In the present embodiment, the standoff is formed of a plurality of individually spaced radial projections, i.e. circumferentially spaced arcuate members. The use of individually spaced radial projections means that the weight of the fan containment system can be advantageously reduced. In alternative embodiments, the standoff extends around the full circumference of the annular casing element 251. The standoff 268 is positioned so as to be located partially along the length of the fan track liner 252, more particularly axially between the leading and trailing edge of the fan blade 40. In the present embodiment, the standoff 268 is positioned so as to be axially aligned with the circumferential rib 262 that is substantially coincident with a position between the leading and trailing edge of the fan blade. The standoff 268 is an L-shaped member that is angled in a forward direction. That is, the L-shaped member includes a radial component 268a that extends more radially than axially and an axial component 268b that extends more axially than radially, and the axial component 268b extends in a substantially axially forward direction away from the radial component 268a.

Provision of the standoff 268 enables the fan track liner 252 to pivot about a point that is selected so as to optimise performance of the fan track liner in both an operational impact and a fan blade off impact situation. In the present embodiment, the fan track liner 252 pivots (at least initially) about a free end of the standoff 268 (i.e. about an end of the axial component 268b distal to the radial component 268a).

In the present embodiment, the performance of the fan track liner has been further optimised by providing a fan track liner that has variable properties along the axial length thereof. That is, the filler layer 258 of the fan track liner 252 includes a forward portion 270 and a rearward portion 272. The material properties and/or material structure of the forward portion are selected so as to increase the likelihood of a fan blade 40 penetrating the forward portion in a fan blade off situation, whilst maintaining resistance to lower energy impacts. The material properties and/or construction of the rearward portion are designed to resist higher energy impacts. An ice impact panel is positioned further rearwards still than the rearward portion of the filler layer 272. The joint between the forward portion 270 and the rearward portion 272 may be chosen to align with or be axially forward of an axially forward end (i.e. a free end) of the axial component 268b of the standoff 268 to assist with hinging of the forward portion of the fan track liner into the voidal space 259.

In the present embodiment, the attrition layer 254 also has a forward portion 274 having different properties to the rearward portion 276. Similarly to the filler layer 258, the forward portion 274 of the attrition layer is selected for efficient performance in a fan blade off scenario and the rearward portion 276 of the attrition layer is selected for efficient performance in an operational impact scenario, e.g. ice impact.

In use, the fan blades 40 may erode a portion of the attrition layer 254 (e.g. as a result of movements of the fan blade rotational envelope), this allows the best possible seal between the fan blades 40 and the fan track liner 252.

In the event of a blade 40, or portion of a blade 40 being released from the rotor (or hub) of the fan, the fan blade will travel radially outwards and axially forwards, which results in the fan blade striking the forward portion of the fan track liner 252. The strike causes the forward portion of the fan track liner 252 to pivot about the standoff 268 and move into the voidal region 259. In the present embodiment, the standoff 268 is configured to bend in a fan blade off scenario. That is, when the fan blade impacts the forward portion of the fan track liner, the fan track liner pivots about the most axially forward position of the standoff. The standoff will bend upon the impact, which will move the pivot point rearward towards the shoulder of the standoff (i.e. to a location near the transition from the axial component 268b to the radial component 268a). In addition, the strike will cause the fan blade 40 to penetrate the forward portion 274 of the attrition layer 254 and to crush the forward portion 270 of the filler layer 258 of the fan track liner 252. Pivoting of the forward portion of the fan track liner accommodates the blade such that further forward motion of the blade causes the blade to strike the hook 260 and be held. Further penetration of the attrition layer and crushing of the filler layer slows the released blade by an amount sufficient that the timing of the impact of the blade with the hook is such that a trailing blade will carry the released blade to be contained by the bypass guide vanes. The crushing of the filler layer removes energy from the released blade portion.

Ice shed from the fan blade 40 will usually shed outwardly and impact the fan track liner. The ice will not substantially damage the fan track liner 252 because the materials and/or liner configuration of the attrition layer and filler layer are selected to resist such an impact. In cases where the blade 40 is a swept fan blade, ice from the swept portion can be shed forward of the point where the leading edge tip aligns with the attrition liner. The materials and/or configuration of the forward portion of the attrition layer and filler layer are selected so as to resist such an impact and mitigate any damage to the fan track liner that could be caused by such an ice impact.

Figure 5:
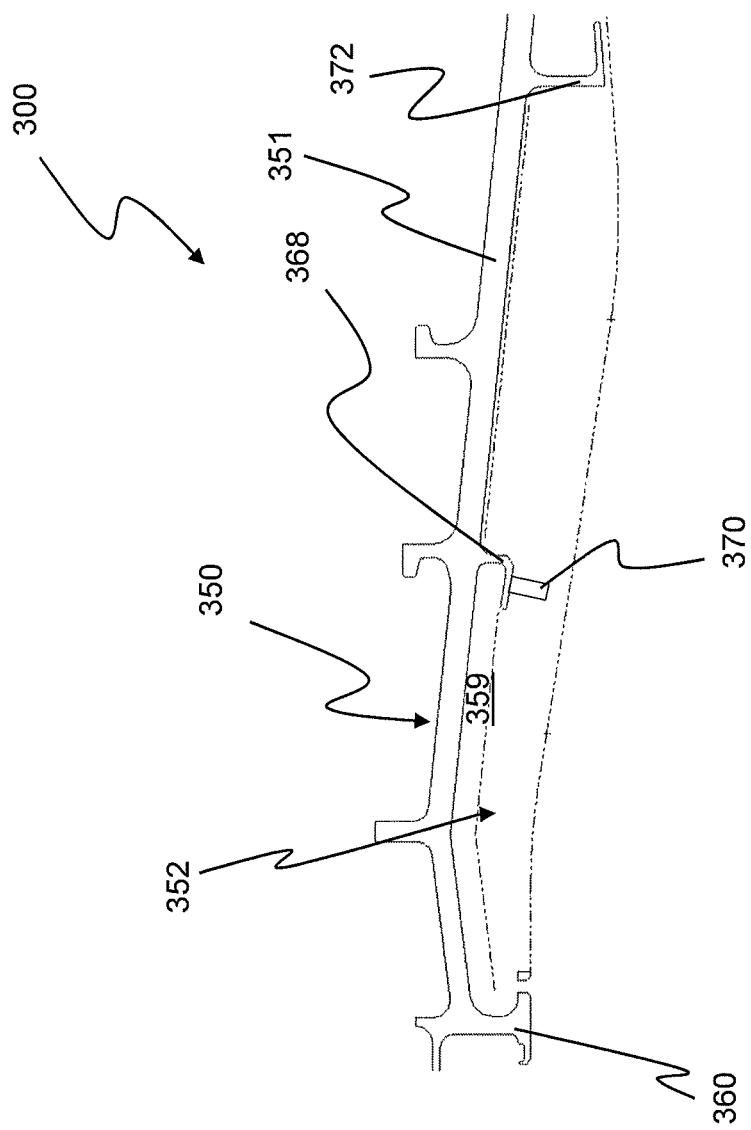
FIG. 5 is a partial cross-section through an alternative fan blade containment system.

Advantageously, the provision of the standoff 268 moves the pivot point radially inwards and axially forwards, which permits the materials used for the fan track liner to be varied along the length thereof and allows the fan track liner to extend rearwardly of the standoff and be attached to the annular casing element at a position rearward of the standoff (as shown in FIG. 5 which will be discussed in more detail below). Varying the properties of the fan track liner along the axial length thereof means that the fan track liner can reach a better compromise between being tough enough to resist impacts such as ice impact and weak enough to permit a released blade to penetrate the attrition liner and preferably crush the filler layer.

It will be apparent to the person skilled in the art the types of materials and/or construction suitable for various portions of the fan track liner. By way of example only, the filler layer of the presently described embodiment is made from an aluminium honeycomb. The forward portion of the filler layer is tuned for a fan blade off scenario and the rearward portion of the filler layer is tuned for ice impact. The septum layer may be formed from a carbon fibre or glass reinforced polymer. The attrition layer may be formed of an epoxy resin that is curable at room temperature. The tray may be formed of a carbon fibre or glass reinforced polymer.

In the embodiment shown in FIG. 4, the spacing between the annular fan casing member and the fan track liner (i.e. the thickness of the voidal region 259) is substantially constant in a region forward of the standoff 268 and rearward of the standoff 268. This arrangement is known as a part panel rear tray arrangement. Alternatively a full depth rear tray arrangement may be provided, as shown in FIG. 5. In the embodiment shown in FIG. 5, the profile of the tray and the thickness of the filler layer is such that the fan track liner is thicker in a region rearward of the standoff than a region forward of the standoff. A small gap, in this embodiment approximately a 2 mm gap (but any suitable distance may be selected), may be maintained between the rearward portion of the fan track liner and the fan casing 350 or alternatively the fan track liner 352 may be directly attached to the annular casing element 351. By way of example, in the embodiment shown the radial thickness of the voidal region is approximately 12 mm, but any suitable distance may be selected. The spacing of the fan track liner to the annular casing element and also the radial thickness of the voidal region is selected to suit a particular engine design and depends on variables such as fan blade length, cantilever trap door length (i.e. length of the forward portion of the fan track liner that pivots about the pivot member), and stiffness requirements of the fan track liner 352 and fan casing 350.

A further advantage of the provision of the standoff 268, 368 is that the panels of the fan track liner can be selectively secured to the standoff. The use of fasteners 370 is illustrated in FIG. 5. Selectively securing the panels to the standoff reduces the relative movements between adjacent fan track liner panels, and reduces wear of the fan track liner, and in some cases reduces wear and heating of the fan blade tips. The securing fasteners do not go into the annular casing member 251 so the fasteners do not have a substantial effect on the fire integrity or containment integrity of the fan containment system. As can be seen in FIG. 5, the fastener 370 is sunk into the fan track liner and covered by fan track liner material e.g. filler layer material and/or attrition layer material.

The fasteners connecting the fan track liner to the hook 360, the standoff 368 and/or the support 372 may be spaced to be out of phase of the other connections (e.g. the sequence of fasteners connecting to the standoff is out of phase of the sequence of fasteners connecting to the hook). Additionally, or alternatively, the fasteners connecting the fan track liner to the hook, standoff or support may be circumferentially spaced by varying amounts. Arranging the fasteners in this way can break up the resonant frequency of the fan track liner panels to reduce the risk of a passing blade forcing a natural vibration of the fan track liner panels in the normal running range. Further, adjacent fan track liner panels can damp neighbouring fan track liner panels.

In the embodiment shown in FIG. 5, a support member 372 protrudes radially inwards from the annular casing element 351. In the present embodiment, the support member 372 is formed of a series of circumferentially spaced protrusions, but in alternative embodiments the support member may extend fully around the annular casing element (i.e. with no interruptions/spacing). A rearward end of the fan track liner 352 is connected to the support member 372. In the present embodiment, the attrition layer extends to connect to the support member, but in alternative embodiments the fan track liner 352 may be connected to the support member via the tray.

It will be appreciated by one skilled in the art that, where technical features have been described in association with one embodiment, this does not preclude the combination or replacement with features from other embodiments where this is appropriate.

Furthermore, equivalent modifications and variations will be apparent to those skilled in the art from this disclosure. Accordingly, the exemplary embodiments of the invention set forth above are considered to be illustrative and not limiting.

For example, the fan track liner may not include a tray. In such an embodiment a connector may be provided as a link between the hook 260 and the fan track liner 252, 352.

In the present embodiment the filler layer of the fan track liner is an aluminium honeycomb structure, but in alternative embodiments an alternative filler layer may be used (e.g. a foam (for example a metal or synthetic foam)) or a honeycomb structure made from a material other than aluminium (for example a meta-aramid material)). The filler layer of the described embodiment is formed of the same material in a radial direction. However, in alternative embodiments, the filler layer may be formed of one or more radial layers (e.g. sub-layers) connected together via a septum layer. The radial layers may be of different densities, so as to vary the properties of the filler layer in a radial direction.

The voidal region provided between the fan track liner and the fan casing of the described embodiments is exemplary only and may in alternative embodiments be of any suitable radial thickness. Further, the spacing may be filled at least partially with a compressible and heat resistant material.

The standoff of the present invention is an L-shaped member, but in alternative embodiments the standoff may have any suitable shape. For example, the standoff may have a square or rectangular cross section.

Figure 6:
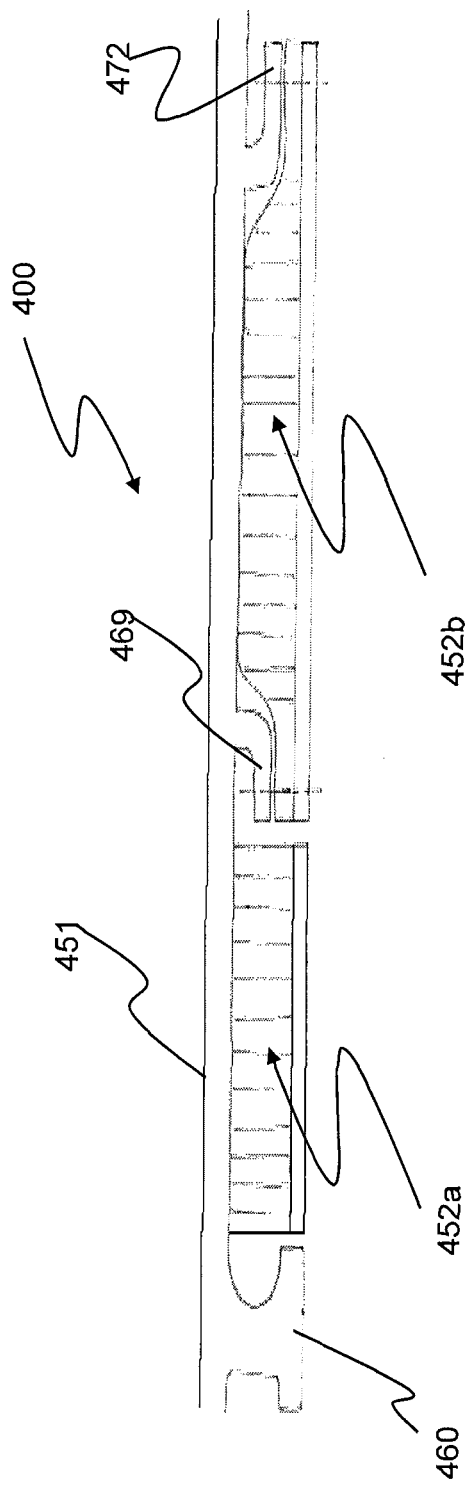
FIG. 6 is a partial cross-section through a further alternative fan blade containment system.

FIG. 6 illustrates an example of a further alternative fan containment system 400. In this instance the fan containment system 400 includes a first fan track liner 452a and a second fan track liner 452b. The second fan track liner 452b is positioned axially rearward of the first fan track liner 452b. Standoffs 469 and 472 extend radially inwardly from the annular casing element 451 and the second fan track liner is connected to the standoffs. In the present example the first fan track liner is bonded to the annular casing element, but in alternative embodiments the first fan track liner may be connected via a further standoff and may have a trap door arrangement as described in the previous embodiments. Advantageously, the replaceable second fan track liner 452b may be positioned where the most foreign object damage may be expected, but where the attrition liner is still required due to the fan blade 40 path. This is because the second fan track liner 452b may require a higher frequency of repair if, for instance, there is a larger amount of ice damage in the region of the intake duct 11 where it is located. The first fan track liner 452a and second fan track liner 452b may swap locations, as required, according to the expected damage in a particular location of the intake duct 11.

Figure 7:
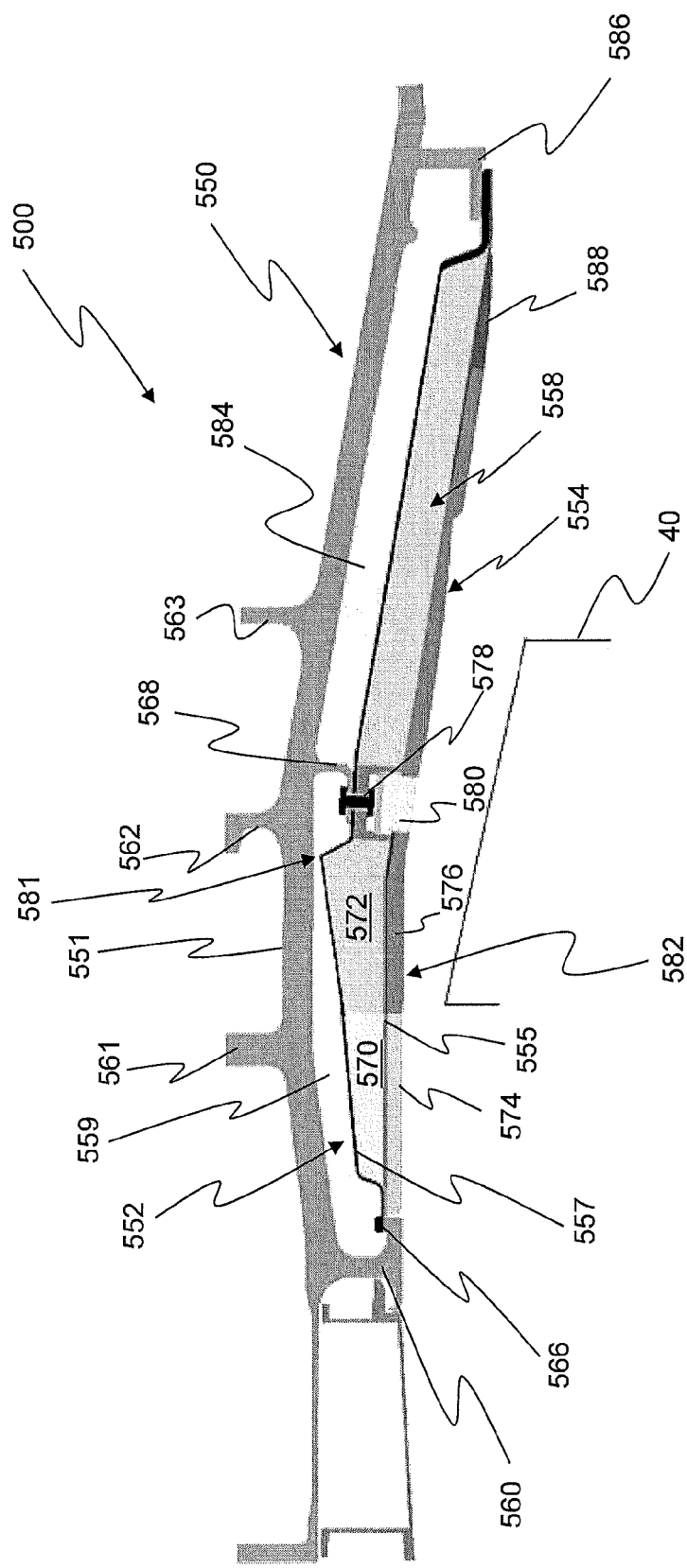
FIG. 7 is a partial cross-section through a yet further alternative fan blade containment system.

Referring now to FIG. 7, a yet further alternative fan containment system 500 is illustrated. The fan containment system 500 includes a fan track liner 552 having a tray 557 that is profiled so that a forward region of the fan track liner, i.e. a region of the fan track liner forward of the standoff 568 increases in radial thickness from a position adjacent the fastener 566 towards a position adjacent the fastener 578. The profile of the tray is such that the thickness of the filler layer increases substantially linearly from a position adjacent the hook 560 to a position adjacent the standoff 568. The thickness then linearly decreases, past the point of maximum radial thickness, so as to form a "knee" 581 of the fan track liner. That is, the forward region of the fan track liner is substantially wedge shaped, an apex of the wedge forming the knee. The knee is spaced from the annular casing element so that in normal operation there is a gap between the knee and the fan case. The remainder of fan track liner has a substantially constant thickness. However, in alternative embodiments the fan track liner may have a substantially constant thickness in the region of the fastener 578 and then in a rearward direction the thickness may increase by a generally stepped change to a further region of constant thickness.

In the present embodiment, the radial thickness increases at a first rate of change and then increases at a second rate of change, the second rate of change being greater than the first rate of change. The change in the rate of change of increase of thickness is substantially coincident with a transition between the forward portion 570 of the filler layer and the rearward portion 572 of the filler layer, which in the present embodiment is substantially mid-way along the forward region. In alternative embodiments, the thickness may increase at a constant rate until the position of the "knee" 581.

In the event of a blade 40, or portion of a blade 40 being released from the rotor (or hub) of the fan, the fan blade will travel radially outwards and axially forwards, which results in the fan blade striking the forward portion of the fan track liner 552. The strike causes the forward portion of the fan track liner 552 to pivot about the standoff 568 and move into the voidal region 559. The knee 581 of the fan track liner then contacts the annular casing element 551 and the forward portion of the fan track liner pivots about the knee.

The shape and arrangement of the fan track liner concentrates the load in a forward direction encouraging one or more of the fasteners 566 to fail, so as to permit the fan track liner to move into the voidal region 559.

In addition, the strike will cause the fan blade 40 to penetrate the attrition layer 554 and to crush the filler layer 558 of the fan track liner 552. Pivoting of the forward portion of the fan track liner accommodates the blade such that further forward motion of the blade causes the blade to strike the hook 560 and be held. Further penetration of the attrition layer and crushing of the filler layer slows the released blade by an amount sufficient that the timing of the impact of the blade with the hook is such that a trailing blade will carry the released blade to be contained. The crushing of the filler layer removes energy from the released blade portion.

Advantageously, the described configuration of the fan track liner means that stress concentrations that may be caused in an impact situation due to the intermittent nature of the fastener connections to the standoff can be removed. Removing these stress concentrations means that the fasteners connecting the fan track liner to the standoff are less likely to fail in preference to the fastener at the hook, and also in preference to the point of transition between the forward portion and rearward portion of the filler layer and attrition layer.

Further, the arrangement of the fan track liner means that the stiffness of the forward portion of the fan track liner is increased from a position near the hook to a position near the standoff 568, which means that as the load on the fan track liner increases due an impinging blade or part of a blade the load will be "thrown forward" to the less stiff forward region.

Optimising the stiffness of the fan track liner by variably thickening the fan track liner means that the voidal region can be utilised, so there are no additional spacial requirements, and the properties of the fan track liner are not disadvantageously affected. Further, after a fan blade or part of a fan blade has been released from the hub, the remaining fan system will be out of balance and will therefore describe a larger orbit. The additional volume of filler layer provided by the fan track liner arrangement means that there is liner material in the region of the extended orbit which reduces the risk of the orbiting fan from cutting through the liner tray or touching the case.

Yet further advantageously, the stiffness profile of the fan track liner arrangement has been found to improve the predictability and control of the path of a released blade (or a released part of a blade), which improves the likelihood of a released blade being forced rearwards by a trailing blade where the released blade is contained by bypass guide vanes of the gas turbine engine.

The invention claimed is:

1. A fan containment system for fitment around an array of radially extending fan blades mounted on a hub in an axial gas turbine engine, the fan containment system comprising:
   an annular casing element for encircling an array of fan blades;
   a hook projecting in a generally radially inward direction from the annular casing element;
   a fan track liner connected to the hook via a fastener configured so as to permit movement of the fan track liner relative to the hook, the fan track liner having a forward end proximal to the hook and a rearward end distal to the hook;
   a voidal region provided between the annular casing element and a forward portion of the fan track liner; and
   a pivot member protruding radially inward from the annular casing element and being arranged and positioned between the forward and rearward end of the fan track liner such that a forward portion of the fan track liner is pivotable about the pivot member, so that upon release of a fan blade the forward portion of the fan track liner pivots about the pivot member into the voidal region provided between the annular casing element and the forward portion of the fan track liner to encourage engagement of the hook with a released fan blade.

2. The fan containment system according to claim 1, wherein the pivot is located in a position such that, in use, when a fan blade is released from a hub a controlled buckling of the released blade tip is made before the released blade's centre of gravity passes the pivot point.

3. The fan containment system according to claim 1, wherein the pivot member is positioned to be, in use, substantially axially aligned with a position between a leading edge and a trailing edge of a fan blade.

4. The fan containment system according to claim 1, comprising a circumferential rib positioned around a radially outer surface of the annular casing element, and wherein the pivot member is substantially axially aligned with the circumferential rib.

5. The fan containment system according to claim 1, wherein the pivot member has a substantially L-shaped cross section.

6. The fan containment system according to claim 5, wherein the pivot member is angled towards a forward position of the fan containment system.

7. The fan containment system according to claim 1, wherein the fan track liner is connected to the pivot member.

8. The fan containment system according to claim 7, wherein the fan track liner is connected to the pivot member using one or more fasteners.

9. The fan containment system according to claim 1, wherein the fan track liner comprises a tray to which a filler layer and/or an abradable layer are attached, and wherein the pivot member extends to a position proximal to the tray and distal to the abradable layer.

10. The fan containment system according to claim 1, wherein the fan track liner comprises a series of arcuate panels arranged so that a longitudinal axis of each arcuate panel is coaxial such that the series of panels form an annulus.

11. The fan containment system according to claim 1, wherein the fan track liner comprises an attrition layer positioned, in use, proximal to the fan blades, and wherein the attrition layer comprises a first portion and a second portion, the first portion having different properties to the second portion, so as to vary the properties of the attrition layer in an axial direction.

12. The fan containment system according to claim 11, wherein the fan track liner comprises a filler layer connected to the attrition layer on a side of the attrition layer distal to, in use, the fan blades, wherein the filler layer is configured to be deformable at a pre-determined load, and wherein the filler layer comprises a first portion and a second portion, the first portion having different properties to the second portion, so as to vary the properties of the filler layer in an axial direction.

13. The fan containment system according to claim 1, wherein a region of the fan track liner forward of the pivot member is shaped so as to have in an axially forward direction a gradually decreasing radial thickness.

14. A fan containment system for fitment around an array of radially extending fan blades mounted on a hub in an axial gas turbine engine, the fan containment system comprising:
   an annular casing element for encircling an array of fan blades;
   a hook projecting in a generally radially inward direction from the annular casing element and positioned axially forward of an array of fan blades when the fan containment system is fitted around said fan blades;
   a fan track liner connected to the hook via a fastener configured so as to permit movement of the fan track liner relative to the hook, the fan track liner having a forward end proximal to the hook and a rearward end distal to the hook;

a standoff protruding radially inward from the annular casing element; and one or more connectors securing the fan track liner to the standoff.

15. The fan containment system according to claim 14, wherein the fan track liner is formed of an axially forward part and an axially rearward part, and wherein the axially forward and/or the axially rearward part is secured to the annular casing element via one or more standoffs.

16. The fan containment system according to claim 14, wherein the fan track liner comprises a plurality of adjacent fan track liner panels and each fan track liner panel is connected to the standoff via one or more fasteners, and wherein the fasteners are spaced so as to break up the natural resonance of the fan track liner panels.

17. The fan containment system according to claim 14, wherein the fan track liner comprises a plurality of adjacent fan track liner panels and each fan track liner panel is connected to the standoff via one or more fasteners, and wherein the one or more fasteners are spaced to be circumferentially out of phase with the fasteners connecting to the hook or fasteners connecting a rearward end of the fan track liner panel to the annular casing element.

18. A fan containment system for fitment around an array of radially extending fan blades mounted on a hub in an axial gas turbine engine, the fan containment system comprising:

a fan case having an annular casing element for encircling an array of fan blades and a hook projecting in a generally radially inward direction from the annular casing element and positioned axially forward of an array of fan blades when the fan containment system is fitted around said fan blades; and a fan track liner wherein the fan track liner is connected to the fan case at the hook via a first connector and at a position axially rearward of the hook via a second connector, wherein the first connector is configured so as to deform or fail to permit movement of the fan track liner relative to the hook such that a forward region of the fan track liner can pivot towards the annular casing element when a pre-determined load is applied to the forward region of the fan track liner; and wherein the forward region of the fan track liner is shaped so as to have in an axially rearward direction a gradually increasing radial thickness and then a decreasing radial thickness so as to form an apex adjacent the annular casing element, the gradually decreasing thickness is directly adjacent the gradually increasing thickness.

19. The fan containment system according to claim 18, wherein the second connector connects the fan track liner to the fan case at a position adjacent the forward region of the fan track liner, and wherein the radial thickness of the fan track liner is substantially constant in a region of the second connector.

20. The fan containment system according to claim 18, wherein in the region of the fan track liner having increasing radial thickness, the radial thickness of the fan track liner increases linearly, and wherein the radial thickness increases at a first rate of change and then increases at a second rate of change.

* * * * *